United States Patent [19]
Motoe et al.

[11] Patent Number: 5,914,853
[45] Date of Patent: *Jun. 22, 1999

[54] PORTABLE COMPUTER

[75] Inventors: Hironori Motoe; Tomomi Murayama, both of Tokyo, Japan

[73] Assignee: Kabushiki Kaisha Toshiba, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/710,703

[22] Filed: Sep. 20, 1996

[30] Foreign Application Priority Data

Feb. 29, 1996 [JP] Japan .................................. 8-043650
Sep. 18, 1996 [JP] Japan .................................. 8-246716

[51] Int. Cl.⁶ ............................................................ G06F 1/16
[52] U.S. Cl. ............................. 361/680; 345/905; 16/223
[58] Field of Search ................................... 361/680–683; 364/708.1; 345/169, 901, 905; 16/223, 342, 343, 250; G06F 1/16

[56] References Cited

U.S. PATENT DOCUMENTS

| | | | |
|---|---|---|---|
| 4,951,241 | 8/1990 | Hosoi et al. ............................. | 364/708 |
| 5,001,659 | 3/1991 | Watabe ................................. | 361/708.1 |
| 5,196,993 | 3/1993 | Herron et al. ........................... | 361/681 |
| 5,208,736 | 5/1993 | Crooks et al. ........................... | 361/393 |
| 5,243,549 | 9/1993 | Oshiba .................................. | 364/708 |
| 5,335,192 | 8/1994 | Oshiba .................................. | 364/708.1 |
| 5,390,075 | 2/1995 | English et al. ........................... | 361/683 |
| 5,394,297 | 2/1995 | Toedter ................................. | 361/683 |
| 5,406,268 | 4/1995 | Fullmer ............................... | 340/815.42 |
| 5,410,497 | 4/1995 | Viletto ................................ | 364/708.1 |
| 5,432,676 | 7/1995 | Satoh et al. ............................ | 361/752 |
| 5,481,430 | 1/1996 | Miyagawa et al. ..................... | 361/681 |
| 5,724,704 | 3/1998 | Seo ...................................... | 16/254 |
| 5,751,544 | 5/1998 | Song .................................... | 361/681 |

FOREIGN PATENT DOCUMENTS 3926189   2/1990   Germany .
WO 94/06073  3/1994  WIPO .

OTHER PUBLICATIONS

IEEE Spectrum, "Incredible Shrinking Computers", pp. 37–41, May 1991.

*Primary Examiner*—Lynn D. Feild
*Attorney, Agent, or Firm*—Limbach & Limbach L.L.P.

[57] ABSTRACT

A small or very small notebook type or palmtop type personal computer has a display device which is attached to a computer main body in an openable and closable fashion. The display device has a display panel body coupled to the computer main body in an openable and closable fashion by hinge mechanisms provided at both ends of the computer main body, and a display panel provided on the computer main body. The bottom portion of the display panel is the horizontal area between both hinge mechanisms. Therefore, the display panel is arranged within the limited space of the display panel body in such a way as to be able to avoid both hinge mechanisms even when the display panel constitutes, for example, a horizontally elongated display screen.

15 Claims, 10 Drawing Sheets

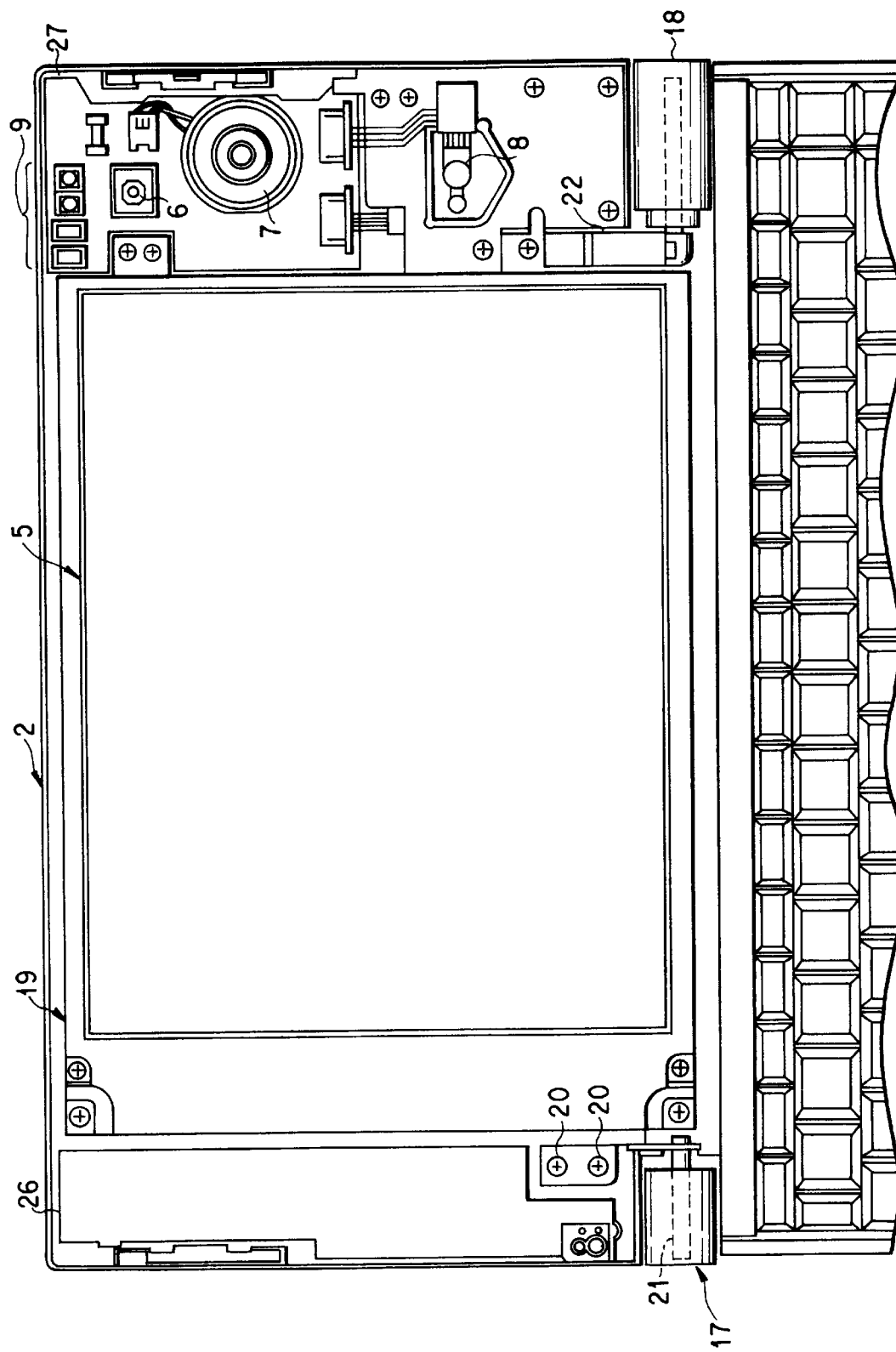
F I G. 4

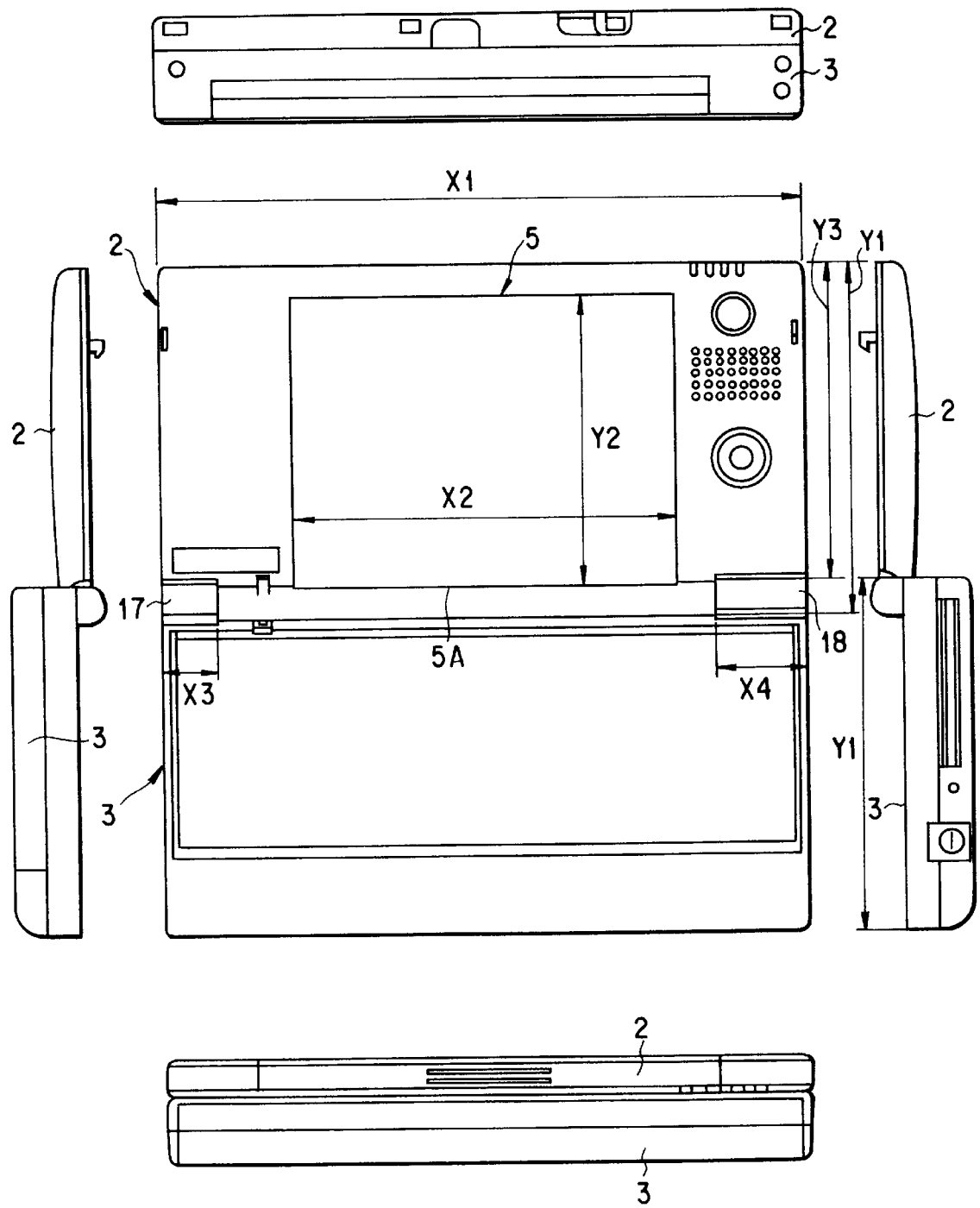
F I G. 7

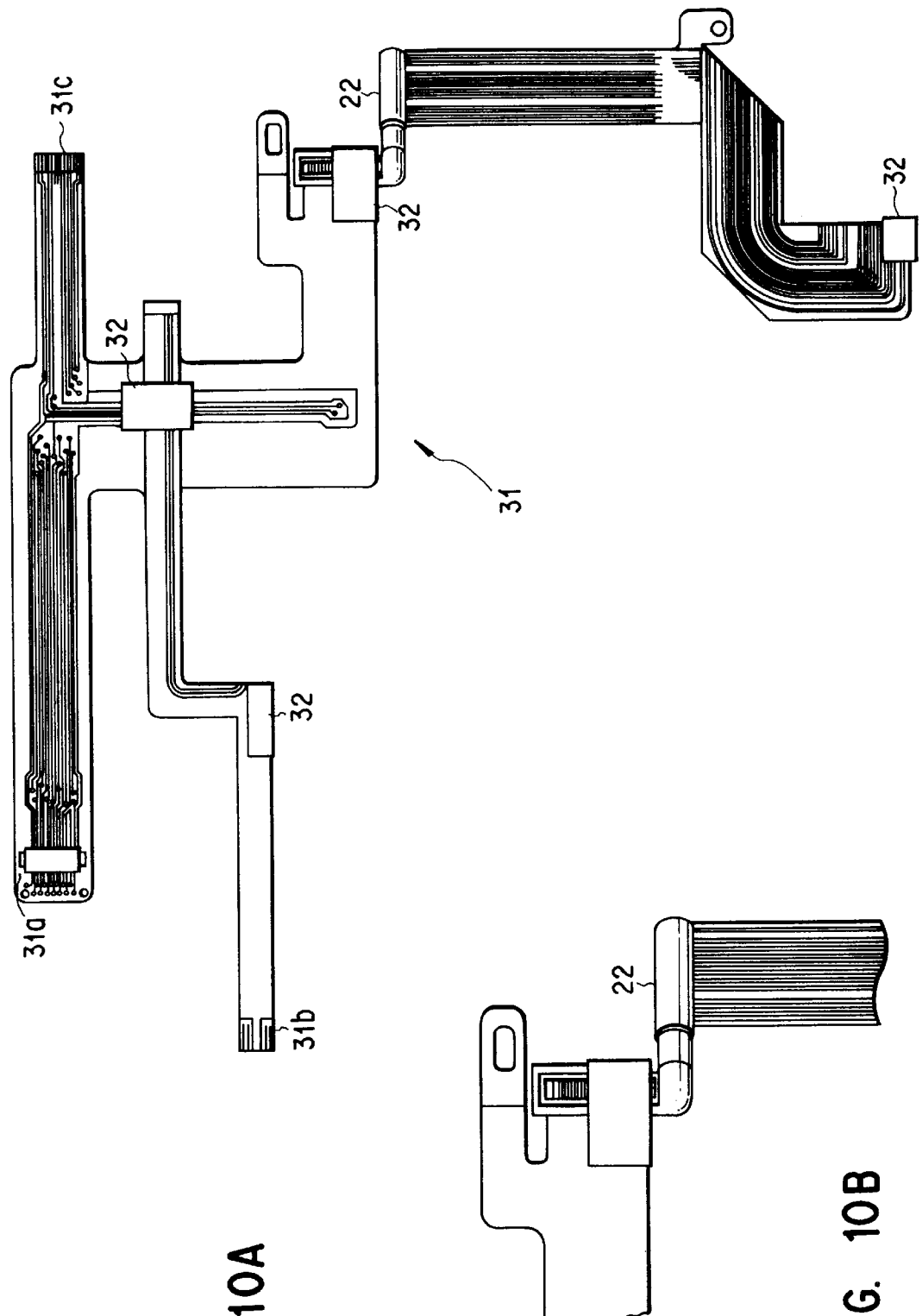

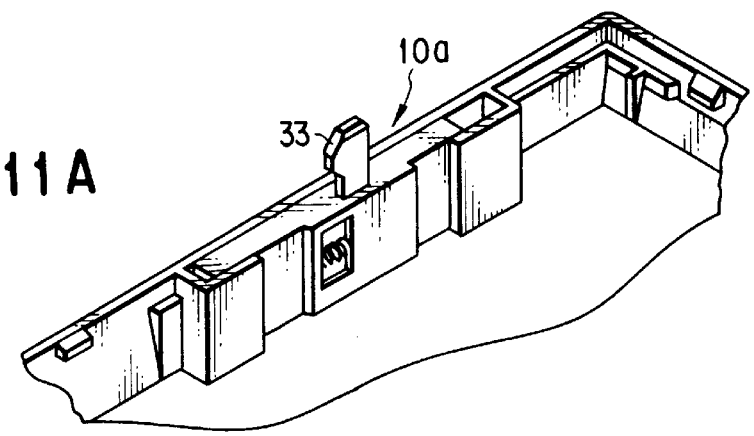
FIG. 11A
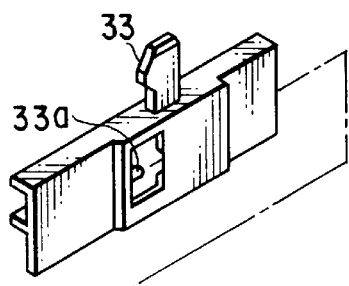
FIG. 11B
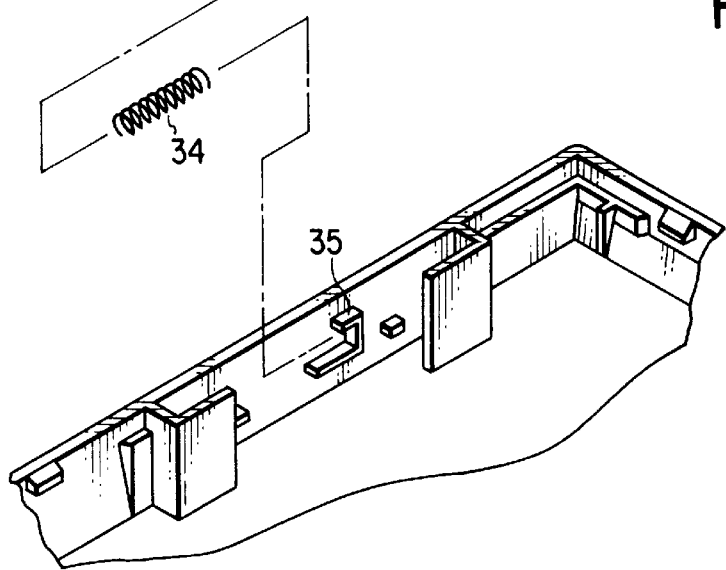
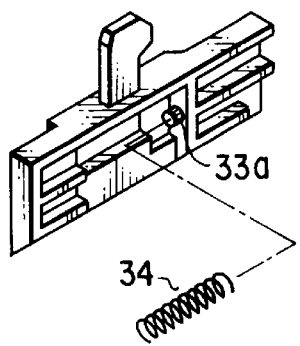
FIG. 11C

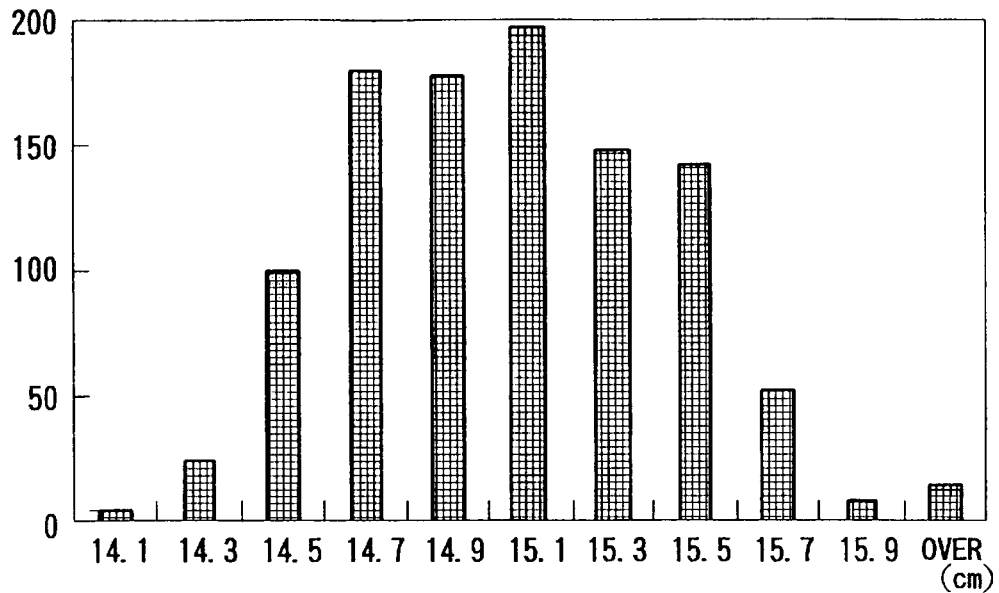
F I G. 12A
| SIZE (cm) | NUMBER OF POCKTS (NP) | SIZE×NP | (SIZE)$^2$×NP | (AVERAGE SIZE-SIZE)$^2$ | (AVERAGE SIZE-SIZE)$^2$ ×NP |
|---|---|---|---|---|---|
| 14.15 | 3 | 42.45 | 600.6675 | 0.914838 | 2.744514 |
| 14.35 | 25 | 358.75 | 5148.063 | 0.572249 | 14.30624 |
| 14.55 | 99 | 1440.45 | 20958.55 | 0.309661 | 30.65642 |
| 14.75 | 178 | 2625.5 | 38726.13 | 0.127072 | 22.61883 |
| 14.95 | 174 | 2601.3 | 38889.44 | 0.024483 | 4.260111 |
| 15.15 | 197 | 2984.55 | 45215.93 | 0.001895 | 0.373258 |
| 15.35 | 146 | 2241.1 | 34400.89 | 0.059306 | 8.65868 |
| 15.55 | 140 | 2177 | 33852.35 | 0.196717 | 27.54043 |
| 15.75 | 52 | 819 | 12899.25 | 0.414129 | 21.53469 |
| 15.95 | 12 | 191.4 | 3052.83 | 0.71154 | 8.53848 |
| 16.15 | 17 | 274.55 | 4433.983 | 1.088951 | 18.51217 |
F I G. 12B

PORTABLE COMPUTER

BACKGROUND OF THE INVENTION

1. Field of the Invention

The present invention relates to a laptop type or palmtop type portable computer, and, more particularly, to a portable computer which has a display device provided integral with a computer main body.

2. Description of the Related Art

Recently, many portable computers designed on portability have been developed. Those computers include notebook type laptop computers and very small personal computers called "palmtop type" or the like.

Such a portable computer usually comes equipped with a keyboard or a pointing device as an input unit, and a display device as an output unit which are integrated with a computer main body. There are many portable computers which incorporate a hard disk drive or a floppy drive as an external storage device.

Ordinary display devices use a liquid crystal display (LCD) for ensuring flatter computers, and each display device is attached to a computer main body so as to be openable and closable to the computer main body. When a computer is not used, the main body (casing) of the display device is closed to the keyboard side to form an outer member like lid or cover of the computer. To use the computer, the user opens the cover and sets the display screen, constituted of an LCD display panel, upright to the horizontal keyboard so that the user can visually confirm the display screen.

As such developed portable computers equipped with an LCD display device become more compact, the display screens of display devices tend to become smaller. While such portable computers have an excellent portability to users who actually use the computers, the users suffer a difficulty in viewing information displayed on the screens.

SUMMARY OF THE INVENTION

Accordingly, it is the primary object of the present invention to improve the usability of a portable computer which has a display device integrated with a computer main body.

It is the second object of this invention to design a portable computer with an integrated display device and computer main body so as to maximize the size of the display screen.

It is the third object of this invention to design a portable computer with an integrated display device and computer main body so as to improve portability.

A display device to be connected to a computer main body according to a first aspect of this invention comprises first and second hinges rotatably coupling the computer main body to the display device; a display screen for displaying information; and a support for supporting the display screen so that a lowest portion of the display screen is located between the first and second hinges.

A computer according to a second aspect of this invention comprises a display panel body including a display device having a display screen; and first and second hinges, provided to sandwich a lowest portion of the display screen, for rotatably coupling the display panel body to the computer main body.

With such structures, it is possible to maximize the display screen particularly with respect to the vertical direction (with the axial direction of the hinge mechanisms being the horizontal direction) within the limited area excluding the hinge mechanisms as the coupling portion to the computer main body in the computer or the display device.

In this computer, the first and second hinges rotate between a closed position where the display screen faces the computer main body and an open position where the display device does not face the computer main body.

In the computer, the display panel body includes a pointing device for entering coordinate information of the display screen.

In the computer, the computer main body includes a circuit board. The computer further includes a flexible printed circuit for connecting the circuit board, the drive board and the display device together; and the first hinge has a holder penetrating therein with a predetermined portion of the flexible printed circuit folded into the holder.

With the above-described structures, it is possible to provide a portable computer with an integrated display device and main body wherein usability is improved while keeping the portability of the computer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 4 is an exterior view showing the display panel body of the portable computer in FIG. 1 with its panel cover removed;

FIG. 7 is a diagram showing the relationship between the size of the display panel body of the portable computer and the size of the display screen of this display panel body;

FIGS. 10A and 10B are diagrams showing the FPC in FIG. 9 in a folded state to be installed into the portable computer with a holder attached to the FPC;

FIGS. 11A to 11C are diagrams showing the latch portion of the display panel body in FIG. 1 in enlargement; and FIGS. 12A and 12B are a graph and a table illustrating size information which determines the sizes of the portable computer in FIG. 1.

DETAILED DESCRIPTION OF THE PREFERRED EMBODIMENT

A preferred embodiment of the present invention will now be described referring to the accompanying drawings.

Figure 1:
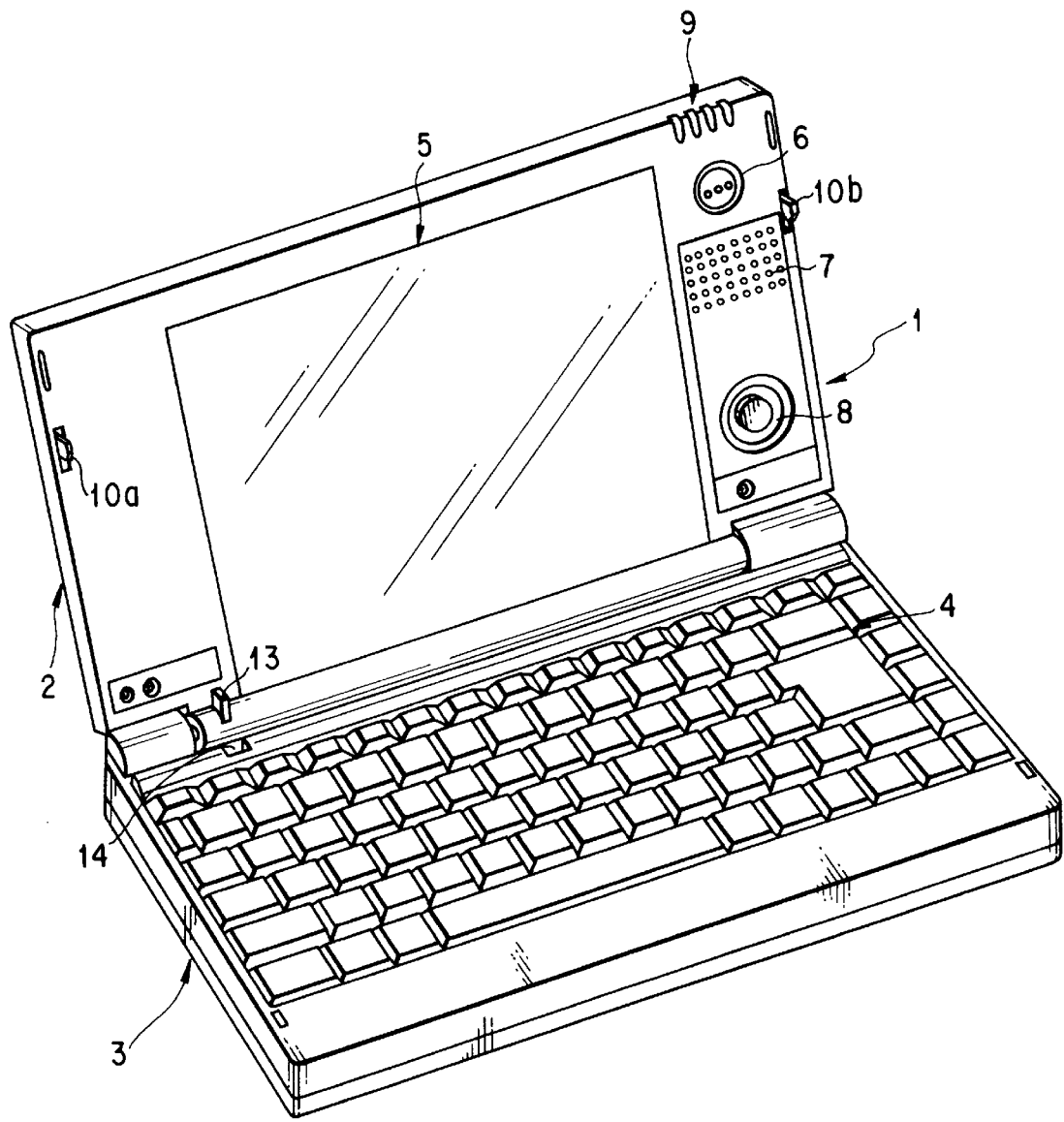
FIG. 1 is a perspective view of a portable computer according to this invention, showing an opened display panel body.

The exterior view of a portable computer according to this invention will be described below with reference to FIGS. 1 to 3. FIG. 1 presents a perspective view of a computer 1 with a display panel body 2 opened, FIG. 2 presents a perspective view of the computer 1 showing the closed display panel body 2 from the front direction (the operational direction by an operator), and FIG. 3 presents a perspective view of the computer 1 showing the closed display panel body 2 from the rear direction.

Figure 2:
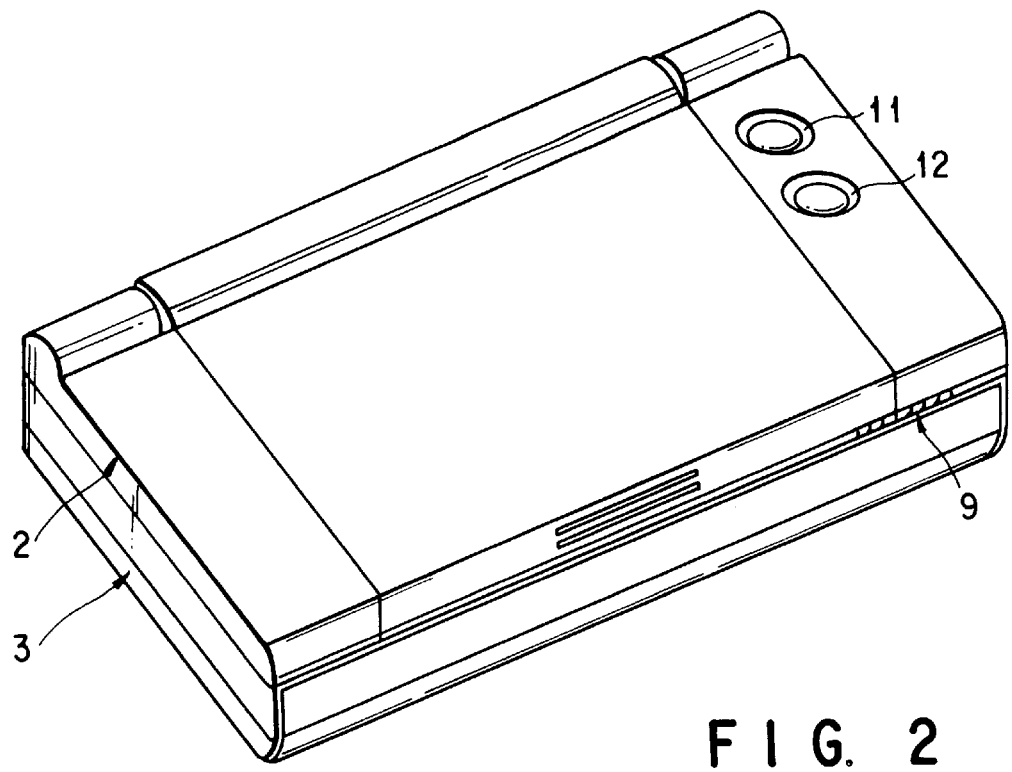
FIG. 2 is a perspective view showing the display panel body of the portable computer in FIG. 1 in a closed state from the front.
Figure 3:
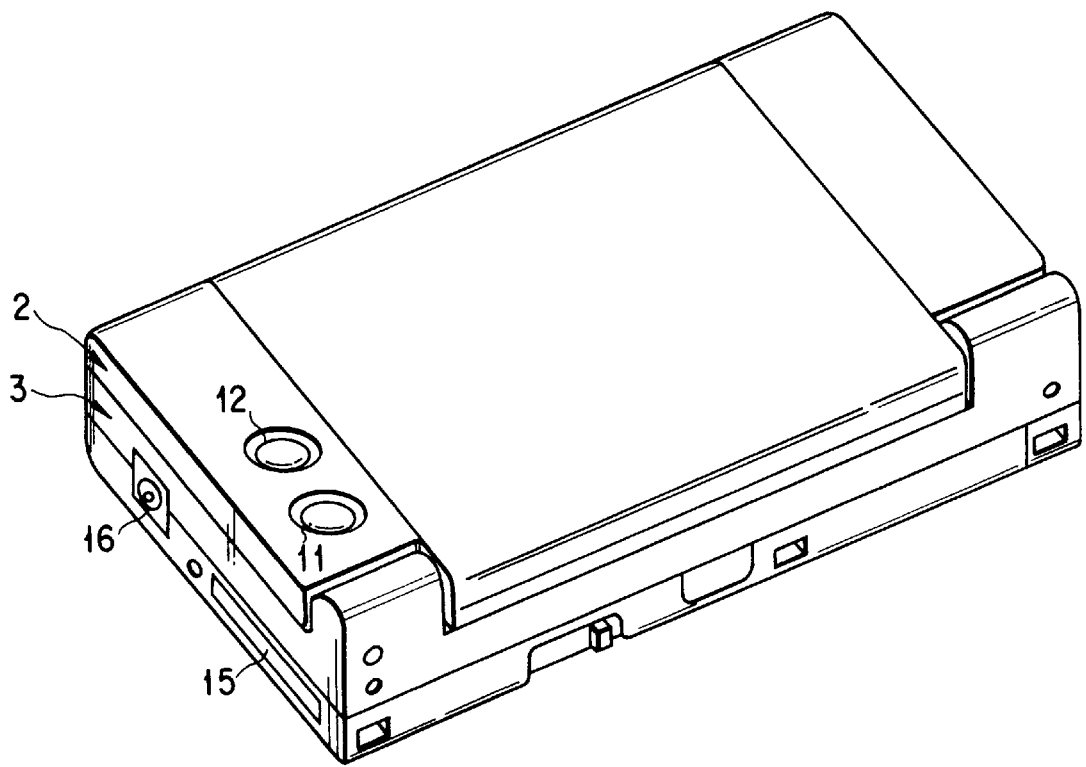
FIG. 3 is a perspective view showing the display panel body of the portable computer in FIG. 1 in a closed state from the back.

The computer 1 illustrated in FIGS. 1 through 3 has a computer main body 3 to which the display panel body 2 incorporating a display device is rotatably attached. To use the computer 1, therefore, an operator can turn the display panel body 2 to be substantially perpendicular to a keyboard 4 which is assembled in the computer main body 3 and can operate the keyboard 4 while viewing a display panel 5. When the computer 1 is not in use, the computer 1 becomes very portable as shown in FIGS. 2 and 3 when the operator turns the display panel body 2 and sets it over the keyboard 4.

The surface (internal surface) of the display panel body 2 that can be set over the keyboard 4 is provided with the display panel 5 which displays various kinds of information when the computer 1 is in use, a power switch 6, a loudspeaker 7, a pointing device 8 and four LEDs (Light-Emitting Diodes) 9 and latch sections 10a and 10b.

The power switch 6 is used to instruct the power ON/OFF of the computer 1 in response to its depression over a predetermined period of time. The loudspeaker 7 informs the operator of various kinds of information by sounds when the computer 1 is used.

The pointing device 8 is used to input the coordinates of the display panel 5. When the operator manipulates the pointing device 8, the position defined by the coordinates displayed on the display panel 5 moves. The input of the coordinates is determined or canceled by using a click button 11 or 12 shown in FIGS. 2 and 3. As those click buttons 11 and 12 are located approximately opposite to the pointing device 8, the operator can operate the pointing device 8 with the thumb of the right hand and the click buttons 11 and 12 with the index finger and middle finger while holding the display panel body 2 with the right hand. In the embodiment, the pointing device 8 is provided apart from a bottom of the computer main body about 25 mm so that a user may operate the computer 1 with that positioning on a desk. The pointing device 8 is provided apart from the power switch 6 father than or equal to 27 mm to distinguish the former from the latter.

The four LEDs 9 are indicators which indicate an access to a hard disk drive, the remaining amount of a battery, etc. Those four LEDs 9 are provided at one corner of the display panel body 2 in such a way as to be seen by the operator not only when the display panel body 2 is open as shown in FIG. 1 but also when the display panel body 2 is closed as shown in FIG. 2. Because those indictors are provided close to the power switch 6, the operator can easily recognize the power ON/OFF status of the computer 1.

When the display panel body 2 is closed or when it is placed over the computer main body 3, the latch sections 10a and 10b latch the display panel body 2 to the computer main body 3. The detailed structure of the latch section 10a is illustrated in FIGS. 11A through 11C. The latch section 10a has a latch 33 which is provided with a projection 33a. One end of a spring 34 is fitted over this projection 33a. The other end of the spring 34 is fitted over a stopper 35 of the display panel body 2 so that the latch 33 is movable in the vertical direction of the display panel body 2 according to the spring force of the spring 34. It is to be noted that neither latch section 10a nor 10b is provided with a manual slide button to slide the latch 33 in the direction to compress the spring 34. Instead, however, predetermined force applied to the latch sections 10a and 10b can open or close the display panel body 2.

According to this embodiment, the entire computer 1 weighs about 840 g and the computer main body weights about 600 g. When force of 700 g to 900 g is applied to the display panel body 2 so as to open the display panel body 2, the latch sections 10a and 10b with the above-described structure move in the direction to compress the springs 34 to permit the display panel body 2 to be opened.

A projection 13 is provided at the lower portion of the display panel body 2. This projection 13 fits in a notch 14 provided in the computer main body 3 when the display panel body 2 is closed. A CPU (Central Processing Unit) of the computer main body 3 detects this engagement of the projection 13 with the notch 14 and can thus detect the closing of the display panel body 2.

As shown in FIG. 3, this computer 1 can incorporate a memory card which conforms to the PCMCIA and which is to be inserted into a card dock 15. The computer 1 can be operated on AC power when an AC adapter is connected to a connector 16.

The display panel body 2 will now be discussed more specifically.

This embodiment is directed to a very small personal computer like a palmtop type, which is provided with a display device 19 having the display panel (display screen) 5 comprised of a liquid crystal display (LCD) as shown in FIG. 4. The display device 19 has the display panel body 2 which has an approximately box-like casing and is coupled to the computer main body 3 in an openable and closable manner by hinge mechanisms 17 and 18.

The hinge mechanisms 17 and 18 are respectively provided at the left and right ends of the display panel 5 as viewed from the front. The hinge mechanism 17 comprises a hinge shaft 21 fixed by a hinge 20 and rotatably holds the display panel body 2 with respect to the computer main body 3. The hinge mechanism 18 has a holder 22 instead of a hinge shaft, and an FPC (Flexible Printed Circuit) which will be discussed later is inserted in the holder 22 in a partially folded manner.

Figure 5:
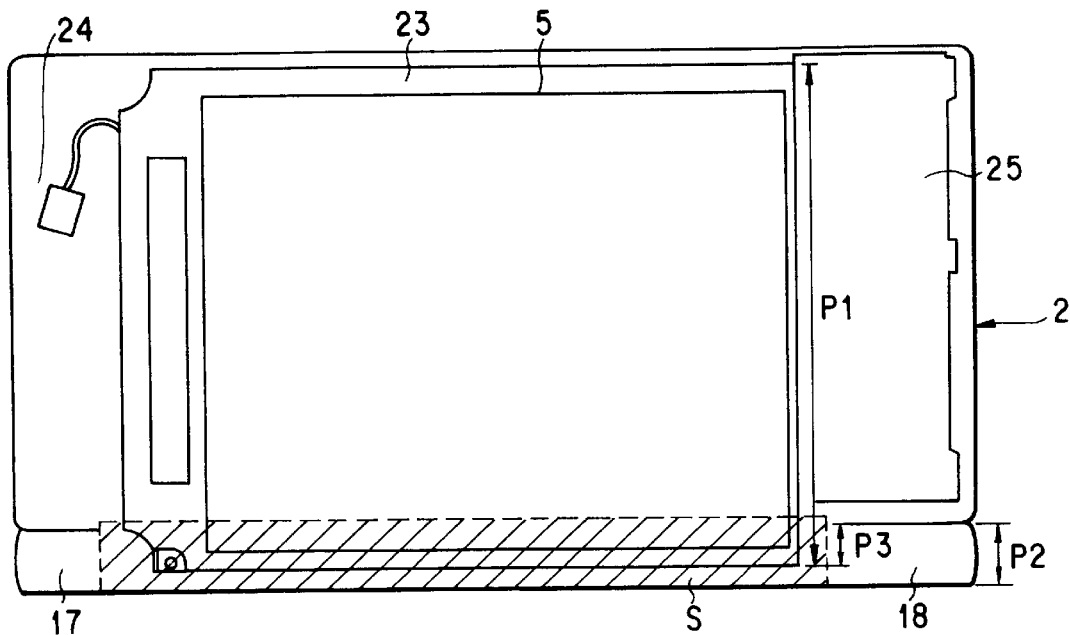
FIG. 5 is a diagram showing the relationship between the size of the display panel body of the portable computer and the size of the display screen of this display panel body.

The internal structure of the display panel body 3, as illustrated in FIG. 5, has a panel support 23 which surrounds and holds the display panel 5, and spaces 24 and 25 at the left and right ends where circuit boards are to be located. As shown in FIG. 4, a circuit board 26 for the LCD (specifically, a board for the back light inverter) is provided in the space 24, and a circuit board 27 for extending functions is provided in the space 25. In the computer 1, a display unit includes the display panel 5 and the panel support 23.

FIG. 7 is a diagram showing external views of the display panel body 2 and the computer main body 3 and the relationship between the sizes of both components. This embodiment is designed on the premise that the horizontal size X1 of the display panel body 2 is about 210 mm (which is of the so-called size A4) and the vertical size Y1 is about 115 mm. That is, the computer 1 of this embodiment has a horizontally elongated size. The depth of the computer 1 is equal to the vertical size Y1.

The display panel 5 which constitutes the display screen has a horizontal size X2 of, for example, about 125.4 mm and a vertical size Y2 of, for example, about 94.6 mm. As shown in FIG. 7, the display panel 5 has its bottom portion 5A located between the hinge mechanisms 17 and 18 and below both hinge mechanisms 17 and 18 (size Y3) in the vertical direction. The size Y3 is approximately 103 mm. The hinge mechanisms 17 and 18 respectively have horizontal sizes X3 and X4 of approximately 18.5 mm and 29.2 mm.

With this structure, the size of the display panel 5 can be increased to maximize the display screen body 2. Specifically, the hinge mechanisms 17 and 18 for coupling the display device 19 to the computer main body 3 are arranged at both end portions to secure the vertical size of the display panel 5 up to the horizontal area between the hinge mechanisms 17 and 18. In other words, the vertical size (Y2) is so set that the bottom portion 5A of the display panel 5 comes below or at the same position as the hinge mechanisms 17 and 18.

As shown in FIG. 5, therefore, the bottom of the panel support 23 for holding the display panel 5 comes further below the upper position of the hinge mechanisms 17 and 18. Specifically, the vertical portion of the panel support 23 with a vertical length P1 comes into the horizontal area S (hatched portion) having a height P2, which is the same as the vertical lengths of the hinge mechanisms 17 and 18, by a length P3.

Even with a horizontally elongated display screen in use, therefore, the maximum vertical size can be secured to relatively increase the display area within the limited space of the display panel body 2. Since the hinge mechanisms of conventional personal computers are located at the lower portion of the display screen, the bottom of the display screen of the display device is positioned above the hinge mechanisms so that the vertical size is limited with respect to the horizontal size. With the structure of the computer 1 of this embodiment which has the hinge portions provided apart from the display device, it is possible to set the vertical size of the display screen sufficiently large and eventually increase the area of the display screen.

Figure 6:
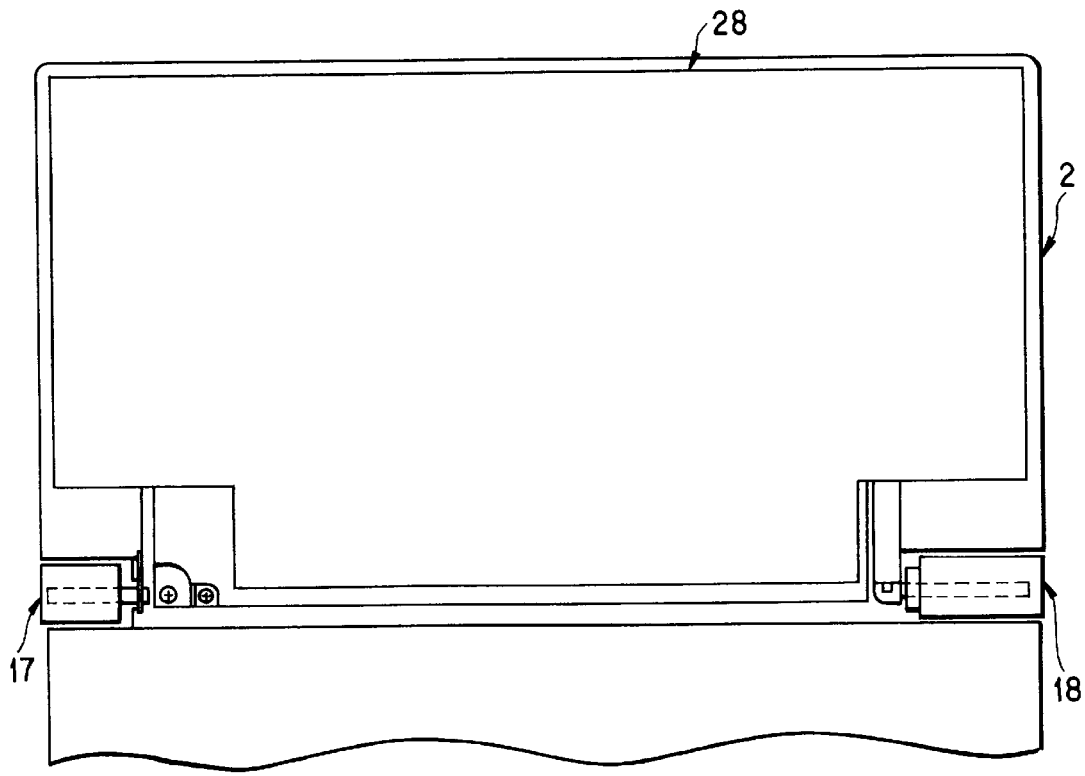
FIG. 6 is a diagram showing a modification of the display panel body shown in FIG. 4.

A modification of the display panel body 2 according to this embodiment is illustrated in FIG. 6. According to this modification, a display panel 28 does not have the ordinary rectangular shape, but is designed to include a protruding portion which comes between the hinge mechanisms 17 and 18. In this case, the horizontal size of the display panel 28 is maximized within the limited space of the display panel body 2.

In the above-described embodiment, the ratio of the vertical size to the horizontal size of the display panel 5 may be set to the so-called wide aspect (vertical-to-horizontal size ratio of 9:16).

The circumferential size of the above-described computer 1 about the Y axis shown in FIG. 7 is set based on the graph and table illustrated in FIGS. 12A and 12B.

FIG. 12B is a table giving a collection of pocket sizes of men's jackets, and FIG. 12A is a graph showing those values. The total number of examined jackets is 1043, and the average pocket size is 15.10647 cm with a standard deviation (s)=0.391542 and a variance ($s^2$)=0.153305. From those results, the circumferential size of the computer 1 about the Y axis is set less than or equal to 15.10647 cm×2. In this embodiment, the thickness of the computer 1 is set to 34 mm and the depth of that is set to 115 mm (Y1), thereby yielding the following expression: (34+115) mm<15.10647 mm. Therefore, the computer 1 may fit in the pocket of a men's jacket.

A description will now be given of the components which are to be installed in the display panel body 2 and the computer main body 3.

As described above, the display panel body 2 incorporates the inverter board for LCD backlight 26 and the extending function circuit board 27 together with the panel support 23. The computer main body 3 incorporates a circuit board 29 which is the mother board, the keyboard 4, and an FPC 30 which connects the keyboard 4 to the mother board. The inverter board for LCD backlight 26, the extending function circuit board 27 and the circuit board 29 are mutually connected by the FPC 31.

The FPC 31 has connectors 31a through 31d. The connector 31a is connected to a LCD connector 31a' provided on the panel support 23. The connector 31b is connected to a connector 31b' of the inverter board for LCD backlight 26. The connector 31c is connected to the connector 27a of the extending function circuit board 27. The connector 31d is connected to the connector 29a of the circuit board 29. With those connections, the individual boards 26, 27 and 29 and the LCD are mutually connected.

As mentioned earlier, the pointing device 8, the loudspeaker 7, the power switch 6 and the LEDs 9 for indicating the functions are mounted on the extending function circuit board 27. In accordance with the ON action of the power switch 6, power or a display signal is supplied to the LCD via the FPC 31.

The circuit board 29 which is installed in the computer main body 3 has another connector 29b which is directly connected to a battery pack as the system power supply.

Figure 8:
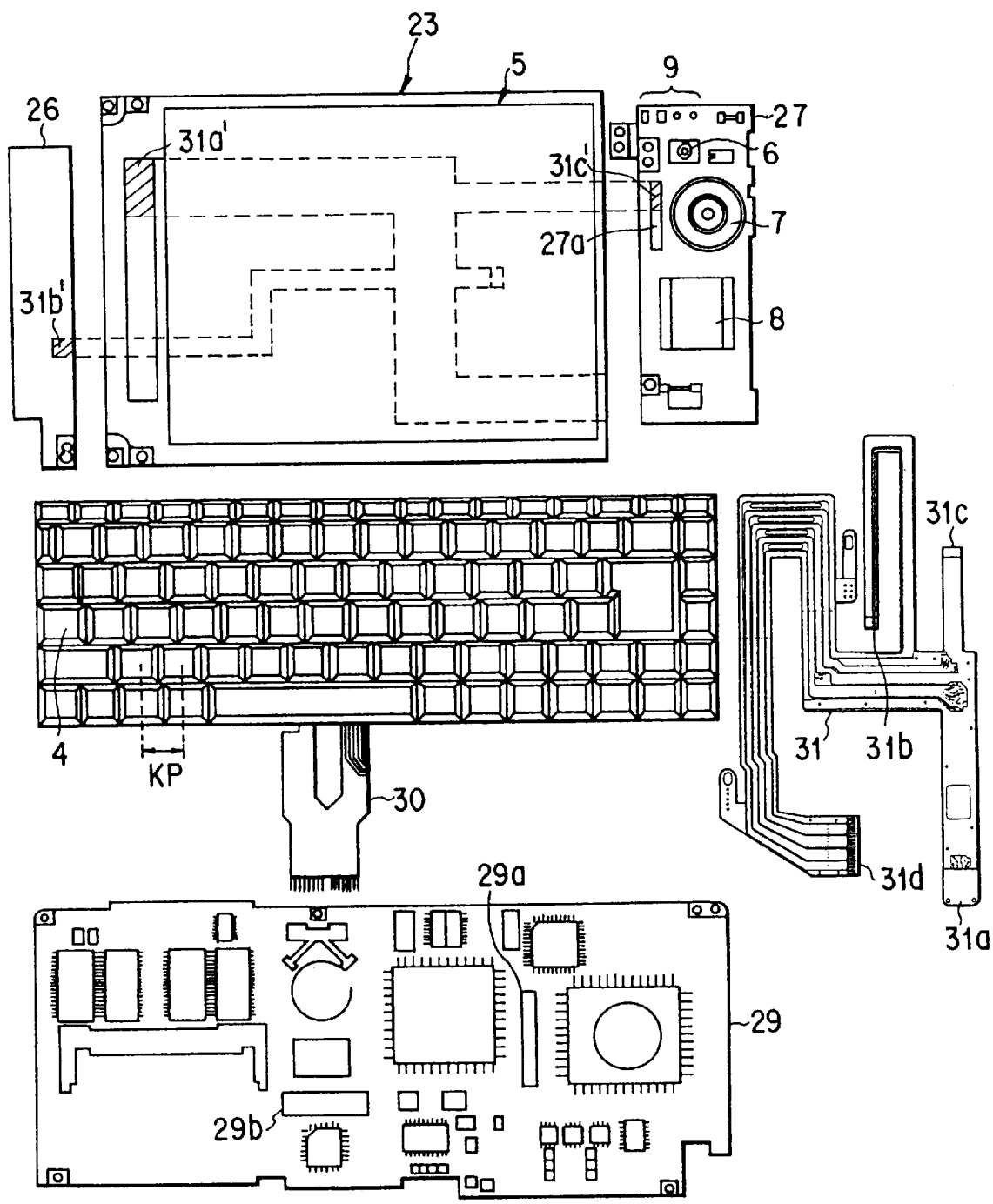
FIG. 8 is a diagram illustrating the internal structure of the portable computer shown in FIG. 1.

The keyboard 4 in this embodiment has a key pitch (KP) between the individual keys of about 13 mm and a key stroke of about 1.5 mm as shown in FIG. 8. The minimum key pitch demanded is 10 mm or greater according to a width of a finger, and is set to 13 mm in this embodiment which is the minimum size to allow a user to operate the keyboard with fingers and to operate seventeen function keys which are arranged in the horizontal direction (X1). The key stroke is set to 1.5 mm as the minimum value which allows the user to feel the depression of the keys.

According to this embodiment, as discussed above, the circuit board 26 associated with the LCD and also the extending function circuit board 7 associated with the operation of the computer main body 3 are provided in the display panel body 2. In designing a very small personal computer like a palmtop type computer, therefore, the installing space for the extending function circuit board 27 can be removed from the computer main body 3 so that such a very small computer can easily be accomplished.

Figure 9:
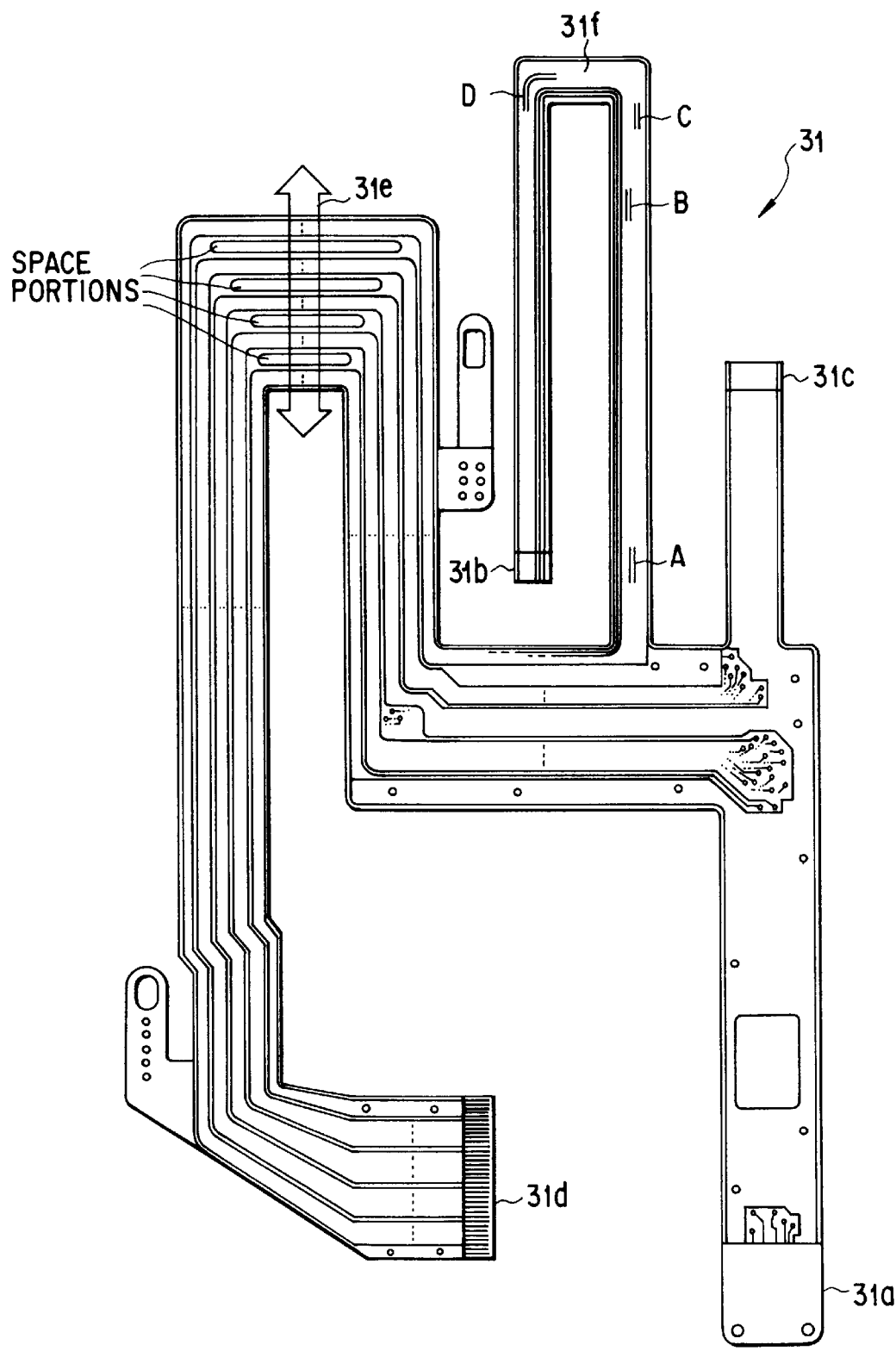
FIG. 9 is a diagram showing an FPC (Flexible Printed Circuit) shown in FIG. 8 in enlargement.

The FPC 31 is shown in enlargement in FIG. 9. As mentioned above, the FPC 31 connects the display panel body 2 to the computer main body 3 as it is put through the holder 22 of the hinge mechanism 18. At this time, the FPC 31 is folded by a predetermined scheme at a folding portion 31e shown in FIG. 9. The FPC 31 is put through the holder 22 as shown in FIG. 10B. When the FPC 31 is installed on the computer 1, it is fixed with a predetermined shape by a tape 32 as shown in FIG. 10A to secure the strength of the FPC 31 against the opening/closing action of the display panel body 2.

The predetermined scheme at a folding portion 31e will be described with reference to FIG. 9. The folding portion 31e is folded at a space portion provided in the folding portion 31e as folds. As the folding portion 31e is folded, the width of the space portion becomes narrower. Therefore, the folding portion 31e has strength and flexibility. Furthermore, the folding portion 31e is made strong by the holder 22.

Next, folding portions A, B, C and D of the FPC 31 are folded. Each of folding portions A, B, C and D are marked with a two line mark wherein the lines are in parallel with the lines of the FPC. The operator just folds the FPC at the folding portions A, B, C and D according to the two line mark, thereby making the folding operation of the FPC simple. The two line mark is made by notching on a grand line 31f. Therefore, the mark is made easily without a wiring problem.

After the above processing, the FPC is in the fold state as shown in FIG. 10, and each connector may connect to the connector of the display device side.

As apparent from the above, this embodiment has the single connector 29a of the circuit board 29 on the computer main body side (3) and uses the single flexible printed circuit board (cable) 31 which connects to the individual circuit boards on the display device side. This flexible printed circuit board 31 is provided with a plurality of connectors 31a to 31d which respectively connect to the individual circuit boards on the display device side.

Since this structure has the extending function circuit board 27 provided on the display device side, it is possible to eliminate installing space on the computer main body side, and reduce the space for installing the signal line cable like a flexible printed circuit board for connecting the individual circuit boards on the display device side to the circuit board on the computer main body side. In other words, a single flexible printed circuit board is connected to the computer main body side by a single connector and the single flexible printed circuit board is connected to the display device side by a plurality of connectors provided on this flexible printed circuit board, thus simplifying the connection between the computer main body and the display device.

In short, this invention can provide a small or very small personal computer, particularly, a notebook type or a palm-top type computer with a display device integrated with a computer main body, which is designed to effectively use the space excluding the openable and closable coupling portion between the display device and the computer main body to thereby maximize the display screen comprised of a display panel. Even when the display device is designed compactly as the computer main body becomes compact, therefore, the display screen can be set as large as possible so that a user can easily view the display device of such a small computer.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A display device for connecting to a computer main body, comprising:
    first and second hinges rotatably coupling said computer main body to said display device; and
    a display panel for displaying information having a bottom portion located both vertically below and horizontally between a top portion of each of said first and second hinges.

2. A display device according to claim 1, wherein said first and second hinges are located at a rearmost position of said computer main body.

3. A display device according to claim 2, further comprising an extending function circuit board for extending a function of said circuit board.

4. A computer comprising:
    a computer main body;
    a display device including a display panel and first and second hinges, said display panel for displaying information;
    wherein said first and second hinges rotatably couple said computer main body to said display device, wherein said display panel has a bottom portion located both vertically below and horizontally between a top portion of each of said first and second hinges.

5. A computer according to claim 4, wherein each of said first and second hinges includes only one shaft.

6. An electronic device, comprising:
    a main body having a first and second support portions; and
    a display unit rotatably supported between the first support portion and the second support portion, wherein the display unit comprises:
    a first cover;
    a second cover coupled with the first cover and defining an opening; and
    a display panel disposed between the first cover and the second cover and exposed via the opening, wherein the opening has a bottom edge located below a top portion of said first and second support portions.

7. (New) The electronic device of claim 6, wherein the second support portion is a hinge mechanism having a shaft.

8. The electronic device of claim 6, further comprising a flexible printed circuit, wherein the second support portion defines a through hole into which a predetermined portion of said circuit is folded.

9. The electronic device of claim 8, wherein the main body further comprises a circuit board which electrically connects the flexible printed circuit to the display device.

10. The electronic device of claim 6, wherein a vertical-to-horizontal ration of the display panel is nine-to-sixteen.

11. An electronic device, comprising:
    a main body having first and second support portions; and
    a display unit rotatably supported between the first support portion and the second support portion, wherein the display unit comprises:
    a first cover;
    a second cover coupled with the first cover and defining an opening; and
    a display panel disposed between the first cover and the second cover and exposed via the opening, wherein the display panel has a bottom edge located below a top portion of said first and second support portions.

12. The electronic device of claim 11, wherein the second support portion is a hinge mechanism having a shaft.

13. The electronic device of claim 11, further comprising a flexible printed circuit, wherein the second support portion defines a through hole into which a predetermined portion of said circuit is folded.

14. The electronic device of claim 13, wherein the main body further comprises a circuit board which electrically connects the flexible printed circuit to the display device.

15. The electronic device of claim 11, wherein a vertical-to-horizontal ration of the display panel is nine-to-sixteen.

* * * * *